(12) United States Patent
Osaka et al.

(10) Patent No.: US 8,503,121 B2
(45) Date of Patent: Aug. 6, 2013

(54) LENS DRIVING DEVICE CAPABLE OF SUPPRESSING A REDUCTION OF MAGNETIC EFFICIENCY OF A MAGNETIC CIRCUIT

(75) Inventors: Tomohiko Osaka, Tokyo (JP); Takashi Ishizawa, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 144 days.

(21) Appl. No.: 13/161,728

(22) Filed: Jun. 16, 2011

(65) Prior Publication Data

US 2011/0310500 A1    Dec. 22, 2011

(30) Foreign Application Priority Data

Jun. 16, 2010 (JP) ................................ 2010-137247

(51) Int. Cl.
*G02B 7/02* (2006.01)
(52) U.S. Cl.
USPC .......................................... 359/824; 359/811
(58) Field of Classification Search
USPC ........................................................ 359/824
See application file for complete search history.

(56) References Cited

U.S. PATENT DOCUMENTS

| 7,285,879 | B2 | 10/2007 | Osaka | |
|---|---|---|---|---|
| 7,652,833 | B2 | 1/2010 | Honma | |
| 2010/0002317 | A1* | 1/2010 | Osaka et al. | 359/824 |

FOREIGN PATENT DOCUMENTS

| JP | 2008-026431 A | 2/2008 |
|---|---|---|
| JP | 2008-070859 A | 3/2008 |
| JP | 2009-086139 A | 4/2009 |
| JP | 2009-205042 A | 9/2009 |

* cited by examiner

*Primary Examiner* — James Jones
(74) *Attorney, Agent, or Firm* — Holtz, Holtz, Goodman & Chick, PC (57) ABSTRACT

A lens driving device includes a ring-shaped driving coil fixed to a lens holder so as to position around a tubular portion thereof and a rectangular hollow cylindrical yoke including a plurality of flat-shaped permanent magnets opposite to the driving coil. Each flat-shaped permanent magnet has both ends in a horizontal direction which extend in the proximity of opposed two sides of the yoke. The driving coil is disposed so as to extend up to the vicinity of the both ends in the horizontal direction of each flat-shaped permanent magnet.

3 Claims, 7 Drawing Sheets

LENS DRIVING DEVICE CAPABLE OF SUPPRESSING A REDUCTION OF MAGNETIC EFFICIENCY OF A MAGNETIC CIRCUIT

This application is based upon and claims the benefit of priority from Japanese Patent Application JP2010-137247, filed on Jun. 16, 2010, the disclosure of which is incorporated herein in its entirety by reference.

BACKGROUND OF THE INVENTION

This invention relates to a lens driving device and, in particular, to a lens driving device which is capable of moving a lens holder (a movable portion) for holding a lens assembly (a lens barrel) in the direction of an optical axis.

The portable compact camera is mounted in a camera-equipped cellular mobile phone. The portable compact camera is provided with an autofocus lens driving device. Previously, various autofocus lens driving devices have been proposed. As a driving source (a driving method) for use in such as a lens driving device, a VCM method using a voice coil motor (VCM) is known. The lens driving device of the VCM method comprises, as the driving source, a driving coil and a magnetic circuit which is composed of a yoke or yokes and permanent magnets.

By way of illustration, Japanese Unexamined Patent Application Publication No. 2009-86139 (JP-A-2009-86139) (which may also be called Patent Document 1) discloses a camera module in which a lens driving portion comprises a quadrilateral-shaped coil around an optical axis of a group of pick-up lenses, two flat-shaped magnets disposed to two opposed sides of the coil, and two yokes.

However, in the camera module disclosed in the Patent Document 1, there is a problem where it is impossible to raise efficiency of the magnetic circuit because the two yokes are disposed to the opposed sides of the coil.

On the other hand, Japanese Unexamined Patent Application Publication No. 2009-205042 (JP-A-2009-205042) (which may also be called Patent Document 2) discloses a lens driving device comprising, as a driving source, an octagonal driving coil, a yoke including an octagonal outer cylindrical portion, and a permanent magnet composed of eight rectangular permanent magnet pieces. In the lens driving device disclosed in Patent Document 2, inasmuch as the yoke includes the octagonal outer cylindrical portion, it is possible to suppress a reduction of efficiency of a magnetic circuit.

However, in the lens driving device disclosed in the Patent Document 2, there is a problem where a parts count is much and a mounting man-hour increases because the permanent magnet is composed of the eight rectangular permanent magnet pieces.

For this purpose, the present inventors (the present applicant) already created (made a suggestion) about a related lens driving device comprising a magnetic circuit including a permanent magnet composed of four rectangular (flat-shaped) permanent magnet pieces, in the manner which will later be described in conjunction with FIGS. 1 and 2.

In the related lens driving device, the magnetic circuit comprises a yoke including an outer hollow cylindrical portion having a rectangular hollow cylindrical shape.

In the related lens driving device, each flat-shaped permanent magnet piece is disposed with both ends thereof apart from opposed two sides of the outer hollow cylindrical portion of the yoke. In addition, the driving coil is apart from the flat-shaped permanent magnet piece in proximity to the both ends of the flat-shaped permanent magnet piece. As a result, there is a problem where a magnetic efficiency of the magnetic circuit reduces.

In addition, inasmuch as the related lens driving device uses, as the magnetic circuit, the permanent magnet composed of the four flat-shaped permanent magnet pieces, a component count increases. As a result, there are problems where it increases in costs and a mounting man-hour increases.

SUMMARY OF THE INVENTION

It is therefore an exemplary object of the present invention to provide a lens driving device which is capable of suppressing reduction of a magnetic efficiency in a magnetic circuit.

Other objects of this invention will become clear as the description proceeds.

On describing the gist of an exemplary aspect of this invention, it is possible to be understood that a lens driving device comprises a lens holder including a tubular portion for holding a lens assembly, a ring-shaped driving coil fixed to the lens holder so as to position around the tubular portion, a rectangular hollow cylindrical yoke comprising a plurality of flat-shaped permanent magnets opposite to the driving coil. The lens driving device comprises upper and lower leaf springs disposed both sides of the tubular portion of the lens holder in the direction of the optical axis. The upper and lower leaf springs support the lens holder in the direction of the optical axis shiftably so as to position the lens holder in a radial direction. The lens driving device can positionally adjust the lens holder to the direction of the optical axis, by energizing the driving coil, according to interaction between a magnetic field of the permanent magnet and a magnetic field due to a current flowing through the driving coil. According to the exemplary aspect of this invention, each of the flat-shaped permanent magnets has both ends in a horizontal direction which extend in the proximity of opposed two sides of the yoke, the driving coil is disposed so as to extend up to the vicinity of the both ends in the horizontal direction of each of the flat-shaped permanent magnets.

DESCRIPTION OF THE PREFERRED EMBODIMENTS

Figure 1:
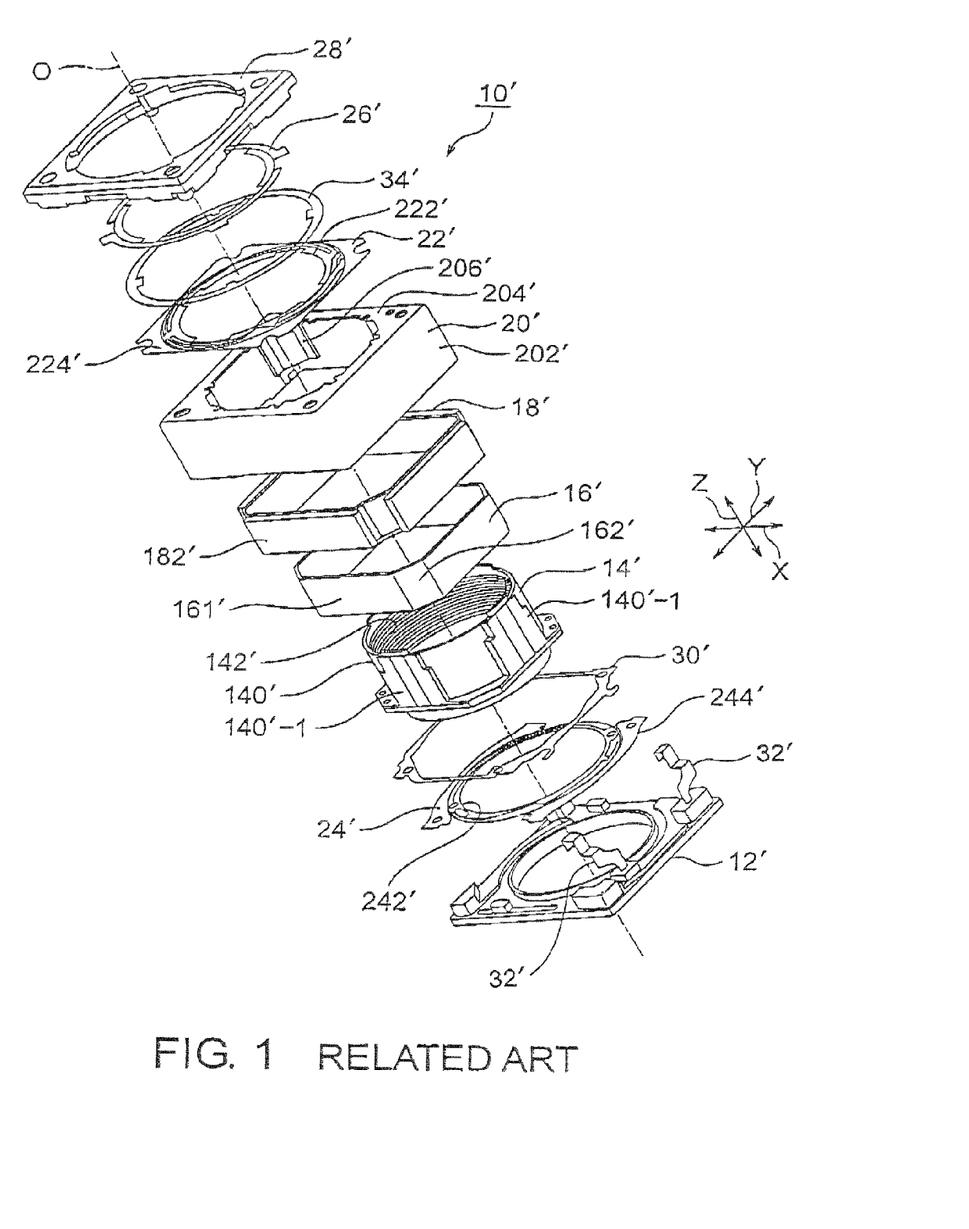
FIG. 1 is an exploded perspective view of a related lens driving device.
Figure 2:
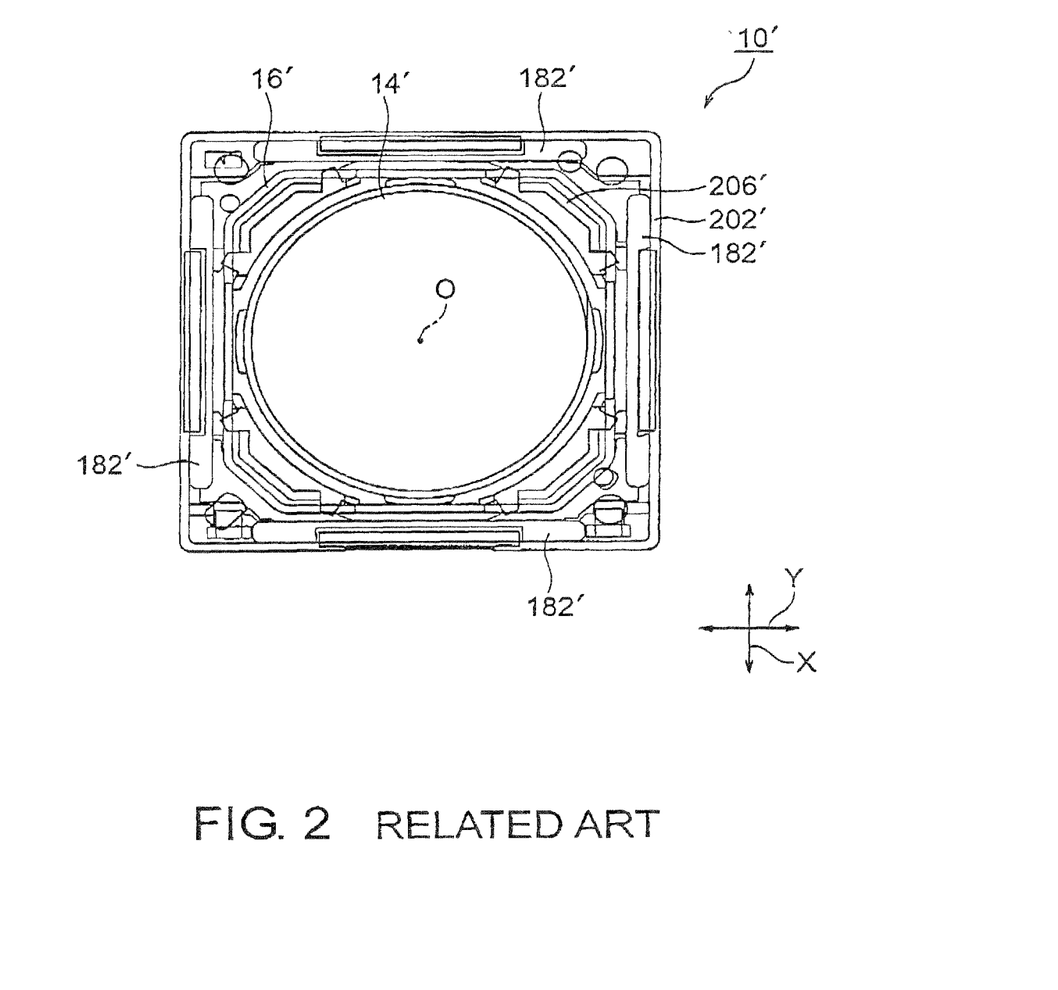
FIG. 2 is a perspective plan view of the lens driving device illustrated in FIG. 1.

Referring to FIGS. 1 and 2, a related lens driving device 10' will be described at first in order to facilitate an understanding of the present invention. FIG. 1 is an exploded perspective view of the related lens driving device 10' while FIG. 2 is a perspective plan view of the related lens driving device 10'.

Herein, in the manner shown in FIGS. 1 and 2, an orthogonal coordinate system (X, Y, Z) is used. In a state illustrated in FIGS. 1 and 2, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 1 and 2, the up-and-down direction Z is a direction of an optical axis O of a lens.

However, in an actual use situation, the direction of the optical axis O, namely, the Z-axis direction becomes a fore-and-aft direction. In other words, an upper direction of the Z-axis becomes a front direction while a lower direction of the Z-axis becomes a rear direction.

The illustrated lens driving device 10' is mounted to a camera-equipped cellular mobile phone which is capable of performing automatic focusing. The lens driving device 10' is for moving a lens assembly (a lens barrel) (not shown) in the direction of the optical axis O. The lens driving device 10' comprises an actuator base 12' which is disposed in a lower side (a rear side) in the Z-axis direction (the direction of the optical axis O). Although illustration is not made, the actuator base 12' has a lower portion (a rear portion) on which an image pickup device disposed on a module board is mounted. The image pickup device picks up a subject image formed by the lens assembly to convert it into an electric signal. The image pickup device may, for example, comprise a CCD (charge coupled device) type image sensor, a CMOS (complementary metal oxide semiconductor) type image sensor, or the like. Accordingly, a camera module comprises a combination of the lens driving device 10', the module board, and the image pickup device.

The lens driving device 10' comprises a lens holder 14' including a tubular portion 140' for holding the lens assembly (the lens barrel), a driving coil 16' fixed to the lens holder 14' so as to position around the tubular portion 140' thereof, a yoke 20' comprising a permanent magnet 18' opposite to the driving coil 16', and a pair of leaf springs 22' and 24' disposed to both sides of the tubular portion 140' of the lens holder 14' in the direction of the optical axis O. The pair of leaf springs 22' and 24' supports the lens holder 14' in the direction of the optical axis O shiftably so as to position the lens holder 14' in a radial direction. In the pair of leaf springs 22' and 24', the one leaf spring 22' is called an upper leaf spring, another leaf spring 24' is called a lower leaf spring.

In addition, in the manner which is described above, in the actual use situation, the upper direction in the Z-axis direction (the direction of the optical axis O) becomes the front direction while the lower direction in the Z-axis direction (the direction of the optical axis O) becomes the rear direction. Accordingly, the upper leaf spring 22' is also called a front-side spring while the lower leaf spring 24' is also called a rear-side spring.

As shown in FIGS. 1 and 2, the yoke 20' has a rectangular cylindrical shape. Specifically, the yoke 20' comprises an outer hollow cylindrical portion 202' having the rectangular cylindrical shape, a rectangular ring-shaped upper end portion 204' extending from an upper end (a front end) of the outer hollow cylindrical portion 202' inward, and four inner vertical extending portions 206' which vertically extend from four corners of the inside of the ring-shaped upper end portion 204' in parallel with the optical axis O downward.

On the other hand, the driving coil 16' has an octagonal cylindrical shape. More specifically, the driving coil 16' comprises four long sides 161' and four short sides 162' disposed between respective two ones of the four long sides 161'. The tubular portion 140' of the lens holder 14' has four contact portions 140'-1 which project outwards in a radial direction at intervals of an angle of 90°. To the four contact portions 140'-1, the four long sides 161' of the driving coil 16 are bonded. That is, the driving coil 16' is bonded to the tubular portion 140' at the four contact portions 140'-1 thereof.

On the other hand, the permanent magnet 18' comprises four rectangular-shaped (flat-shaped) permanent magnet pieces 182' which face the four long sides 161' of the driving coil 16'. The four rectangular-shaped permanent magnet pieces 182' are disposed to inner wall surfaces in four sides of the outer hollow cylindrical portion 202' of the yoke 20'. That is, the permanent magnet 18' comprises the four rectangular-shaped (flat-shaped) permanent magnet pieces 182' which are disposed to the rectangular cylindrical-shaped outer hollow cylindrical portion 202' of the yoke 20' at four sides thereof.

As shown in FIG. 2, the permanent magnet 18' is disposed to the inner wall of the outer hollow cylindrical portion 202' of the yoke 20' with a space between it and the driving coil 16'.

The upper leaf spring 22' is disposed at an upper side of the lens holder 14' in the direction of the optical axis O while the lower leaf spring 24' is disposed at a lower side of the lens holder 14' in the direction of the optical axis O.

The upper leaf spring 22' comprises an inner end portion 222' mounted on the lens holder 14' at the upper side thereof and an outer end portion 224' mounted on the ring-shaped upper end portion 204' of the yoke 20'. Between the inner end portion 222' and the outer end portion 224', a plurality of arm portions are provided. Each arm portion connects the inner end portion 222' to the outer end portion 224'.

The lower leaf spring 24' comprises an inner end portion 242' mounted on the lens holder 14' at a lower end thereof and an outer end portion 244' mounted to the actuator base 12'. Between the inner end portion 242' and the outer end portion 244', a plurality of arm portions are provided. Each arm portion connects the inner end portion 242' to the outer end portion 244'.

The inner end portion 222' of the upper leaf spring 22' is sandwiched between the lens holder 14' and a stopper 26' to be fixed to them. In other words, the stopper 26' is fitted to the lens holder 14' so as to sandwich the inner end portion 222' of the upper leaf spring 22' between it and the lens holder 14'. On the other hand, the outer end portion 224' of the upper leaf spring 22' is sandwiched between the ring-shaped upper end portion 204' of the yoke 20' and a cover 28' to be fixed to them. In addition, between the outer end portion 224' of the upper leaf spring 22' and the cover 28', a ring-shaped plate 34' is disposed.

On the other hand, the outer end portion 244' of the lower leaf spring 24' is fixed to the yoke 20' through a spacer 30'. In other words, the spacer 30' and the outer end portion 244' of the lower leaf spring 24' are sandwiched between the yoke 20' and the actuator base 12' to be fixed to them. The inner end portion 242' of the lower leaf spring 24' is fixed to the lens holder 14' at a lower end (a rear end) side thereof.

The tubular portion 140' of the lens holder 14' has an inner wall in which a female screw thread 142' is cut. On the other hand, although the illustration is not made, the lens assembly (the lens barrel) has an outer wall in which a male screw thread screwed in the above-mentioned female screw thread 142' is cut. In a case of fitting the lens assembly (the lens barrel) to the lens holder 14', it includes the steps of rotating the lens assembly (the lens barrel) with respect to the tubular portion 140' of the lens holder 14' around the optical axis O to screw it along the direction of the optical axis O thereby accommodating the lens assembly (the lens barrel) in the lens holder 14', and of connecting them to each other via an adhesive agent or the like.

By energizing the driving coil 16', it is possible to positionally adjust the lens holder 14' (the lens assembly) in the direction of the optical axis O according to interaction between a magnetic field of the permanent magnet 18' and a magnetic field due to an electric current flowing through the driving coil 16'.

A pair of power supplying members 32' is disposed between the lower leaf spring 24' and the actuator base 12'. The pair of power supplying members 32' is for supplying the driving coil 16' with power.

In the related lens driving device 10', as shown in FIG. 2, each flat-shaped permanent magnet piece 182' is disposed with both ends thereof apart from opposed two sides of the outer hollow cylindrical portion 202' of the yoke 20'. In addition, the driving coil 16' is apart from the flat-shaped permanent magnet piece 182' in proximity to the both ends of the flat-shaped permanent magnet piece 182'. As a result, there is a problem where a magnetic efficiency of the magnetic circuit reduces, as mentioned in the preamble of the instant specification.

In addition, inasmuch as the related lens driving device 10' uses, as the magnetic circuit, the permanent magnet 18' composed of the four flat-shaped permanent magnet pieces 182', a component count increases. As a result, there are problems where it increases in costs and a mounting man-hour increases, as also mentioned in the preamble of the instant specification.

Figure 3:
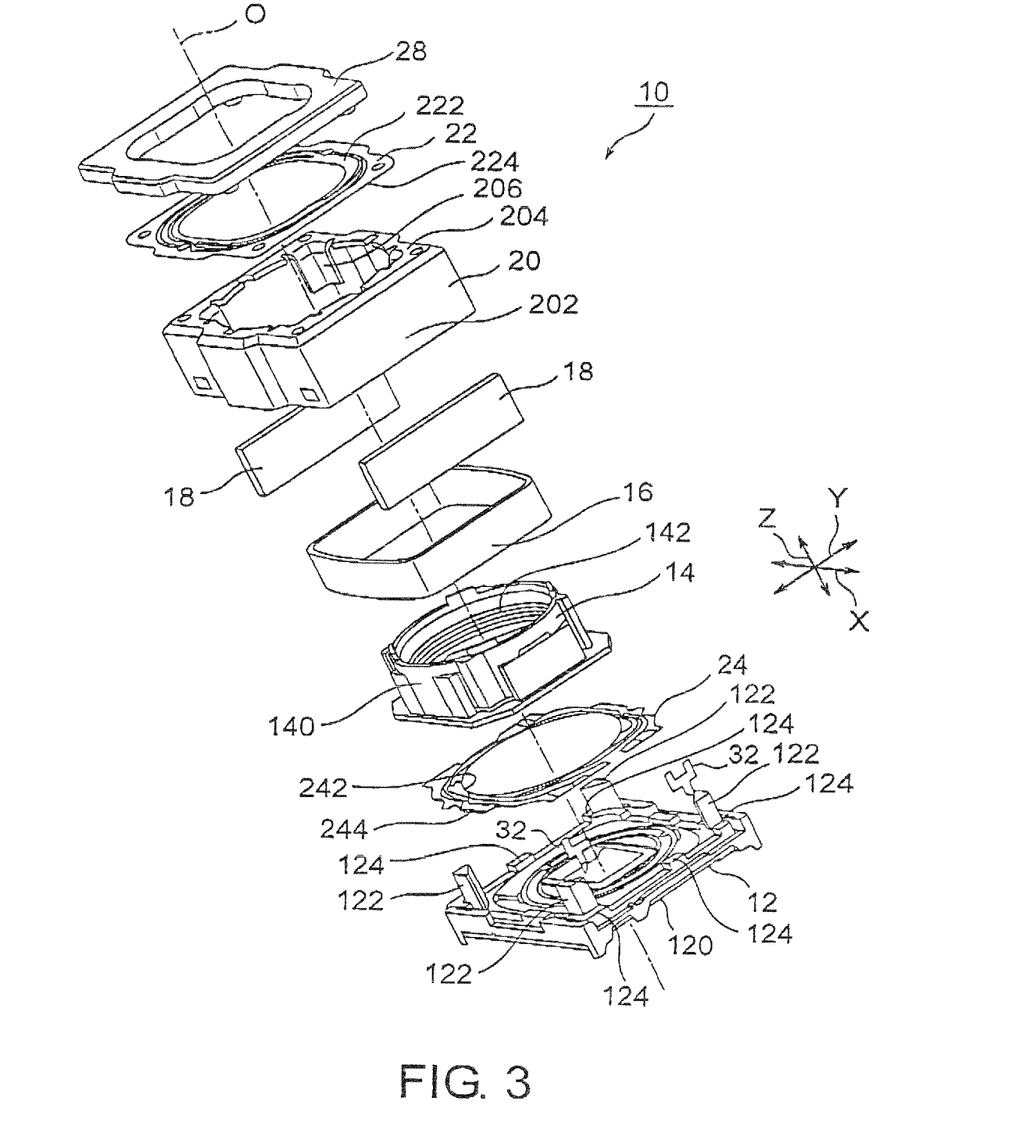
FIG. 3 is an exploded perspective view of a lens driving device according to an exemplary embodiment of the present invention.
Figure 4:
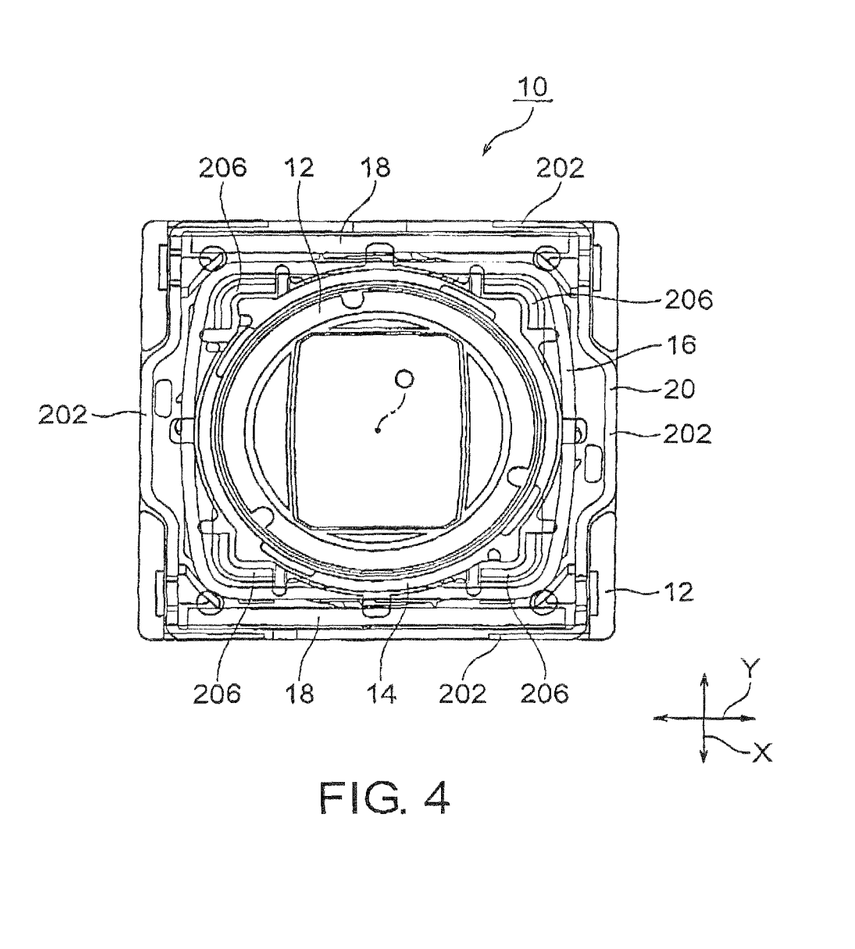
FIG. 4 is a perspective plan view of the lens driving device illustrated in FIG. 3.

Referring to FIGS. 3 and 4, the description will proceed to a lens driving device 10 according to a first exemplary embodiment of this invention. FIG. 3 is an exploded perspective view of the lens driving device 10 while FIG. 4 is a perspective plan view of the lens driving device 10.

Herein, in the manner shown in FIGS. 3 and 4, an orthogonal coordinate system (X, Y, Z) is used. In a state illustrated in FIGS. 3 and 4, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 3 and 4, the up-and-down direction Z is a direction of an optical axis O of a lens.

However, in an actual use situation, the direction of the optical axis O, namely, the Z-axis direction becomes a fore-and-aft direction. In other words, an upper direction of the Z-axis becomes a front direction while a lower direction of the Z-axis becomes a rear direction.

The illustrated lens driving device 10 is a lens driving device which uses, as a driving source (a driving method), a VCM method using a voice coil motor (VCM).

The illustrated lens driving device 10 is mounted to a camera-equipped cellular mobile phone which is enable to automatic focusing. The lens driving device 10 is for moving a lens assembly (a lens barrel) (not shown) in the direction of the optical axis O. The lens driving device 10 comprises an actuator base 12 which is disposed in a lower side (a rear side) in the Z-axis direction (the direction of the optical axis O). Although illustration is not made, the actuator base 12 has a lower portion (a rear portion) on which an image pickup device disposed on a module board is mounted. The image pickup device picks up a subject image formed by the lens assembly to convert it into an electric signal. The image pickup device may, for example, comprise a CCD (charge coupled device) type image sensor, a CMOS (complementary metal oxide semiconductor) type image sensor, or the like.

Accordingly, a camera module comprises a combination of the lens driving device 10, the module board, and the image pickup device.

The lens driving device 10 comprises a lens holder 14 including a tubular portion 140 for holding the lens assembly (the lens barrel), a ring-shaped driving coil 16 fixed to the lens holder 14 so as to position around the tubular portion 140 thereof, a rectangle hollow cylindrical yoke 20 comprising two flat-shaped permanent magnets 18 opposite to the driving coil 16, a pair of leaf springs 22 and 24 disposed to both sides of the tubular portion 140 of the lens holder 14 in the direction of the optical axis O. The pair of leaf springs 22 and 24 supports the lens holder 14 in the direction of the optical axis shiftably so as to position the lens holder 14 in a radial direction. In the pair of leaf springs 22 and 24, the one leaf spring 22 is called an upper leaf spring, another leaf spring 24 is called a lower leaf spring.

In addition, in the manner which is described above, in the actual use situation, the upper direction in the Z-axis direction (the direction of the optical axis O) becomes the front direction while the lower direction in the Z-axis direction (the direction of the optical axis O) becomes the rear direction. Accordingly, the upper leaf spring 22 is also called a front-side spring while the lower leaf spring 24 is also called a rear-side spring.

The upper leaf spring (the front-side spring) 22 and the lower leaf spring (the rear-side spring) 24 are made, for example, of metal such as a stainless steel or a beryllium copper. In addition, each of the upper leaf spring (the front-side spring) 22 and the lower leaf spring (the rear-side spring) 24 is manufactured by a press working against a predetermined thin plate or an etching working using photolithography technique. The etching working is desirable than the press working. This is because residual stress does not remain in the leaf spring in the etching working.

As shown in FIG. 3, the yoke 20 has a substantially rectangular cylindrical shape. Specifically, the yoke 20 comprises an outer hollow cylindrical portion 202 having the substantially rectangular cylindrical shape, a substantially rectangular ring-shaped upper end portion 204 projecting from an upper end (a front end) of the outer hollow cylindrical portion 202 inward. In addition, as shown in FIG. 4, the yoke 20 further comprises four inner vertical extending portions 206 which vertically extend from four corners of the inside of the ring-shaped upper end portion 204 in parallel with the optical axis O downward.

Accordingly, the driving coil 16 also has a substantially rectangular cylindrical shape matched with a shape of the substantially rectangular cylindrical-shaped yoke 20. The driving coil 16 is mounted to an outer wall of the tubular portion 140 of the lens holder 14 so that it is accommodated in a space between the outer hollow cylindrical portion 202 and the four inner vertical extending portions 206 of the yoke 20.

As shown in FIG. 4, the two flat-shaped permanent magnets 18 are disposed to two opposed inner wall of the outer hollow cylindrical portion 202 of the yoke 20 so as to oppose to the driving coil 16 with a space left therebetween. In other words, each of the two flat-shaped permanent magnets 18 has both ends in a horizontal direction thereof which extend up to the proximity of opposed two sides of the yoke 20. In addition, the driving coil 16 is disposed so as to extend up to the vicinity of the both ends in the horizontal direction of each of the two flat-shaped permanent magnets 18.

With this structure, it is possible to suppress a reduction of magnetic efficiency of the magnetic circuit.

Turning back to FIG. 3, the upper leaf spring (the front-side spring) 22 is disposed at an upper side (a front side) of the lens holder 14 in the direction of the optical axis O while the lower leaf spring (the rear-side spring) 24 is disposed at a lower side (a rear side) of the lens holder 14 in the direction of the optical axis O.

The upper leaf spring 22 comprises an inner end portion 222 mounted to an upper end portion on the lens holder 14 and an outer end portion 224 mounted to the ring-shaped upper end portion 204 of the yoke 20. The inner end portion 222 and the outer end portion 224 are couple to each other via a plurality of arm portions. The outer end portion 224 is sandwiched and fixed between the ring-shaped upper end portion 204 of the yoke 20 and a cover 28.

The lower leaf spring 24 comprises an inner end portion 242 mounted to a lower end portion of the lens holder 14 and an outer and portion 244 mounted to the actuator base 12. The inner end portion 242 and the outer end portion 244 are couple to each other via a plurality of arm portions.

The tubular portion 140 of the lens holder 14 has an inner wall in which a female screw thread 142 is cut. On the other hand, although the illustration is not made, the lens assembly (the lens barrel) has an outer wall in which a male screw thread screwed in the above-mentioned female screw thread 142 is cut. In a case of fitting the lens assembly (the lens barrel) to the lens holder 14, it includes the steps of rotating the lens assembly (the lens barrel) with respect to the tubular portion 140 of the lens holder 14 around the optical axis O to screw it along the direction of the optical axis O thereby accommodating the lens assembly (the lens barrel) in the lens holder 14, and of connecting them to each other via an adhesive agent or the like.

By energizing the driving coil 16, it is possible to positionally adjust the lens holder 14 (the lens assembly) in the direction of the optical axis O according to interaction between a magnetic field of the permanent magnet 18 and a magnetic field due to an electric current flowing through the driving coil 16.

A pair of power supplying members 32 is disposed between the lower leaf spring 24 and the actuator base 12. The pair of power supplying members 32 is for supplying the driving coil 16 with power.

In the above-mentioned lens driving device 10, a combination of the lens holder 14 for holding the lens assembly and the driving coil 16 serves as a pillar-shaped movable portion (14, 16) disposed in a central portion. In addition, a combination of the actuator base 12, the permanent magnets 18, the yoke 20, and the cover 28 serves as a hollow cylindrical fixed portion (12, 18, 20, 28) disposed on the periphery of the movable portion (14, 16).

Figure 5:
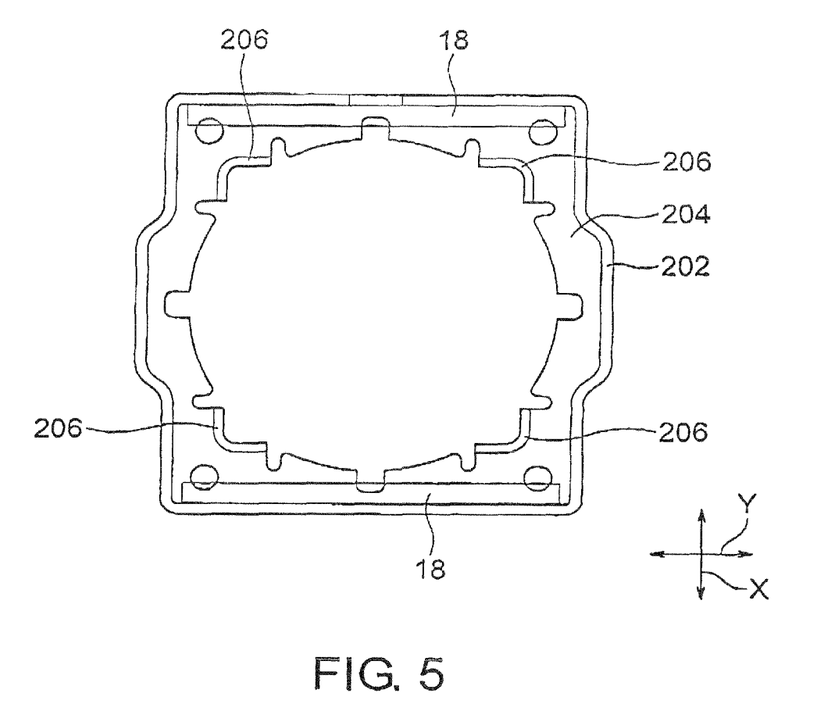
FIG. 5 is a perspective plan view of a magnetic circuit for use in the lens driving device illustrated in FIG. 3.
Figure 6:
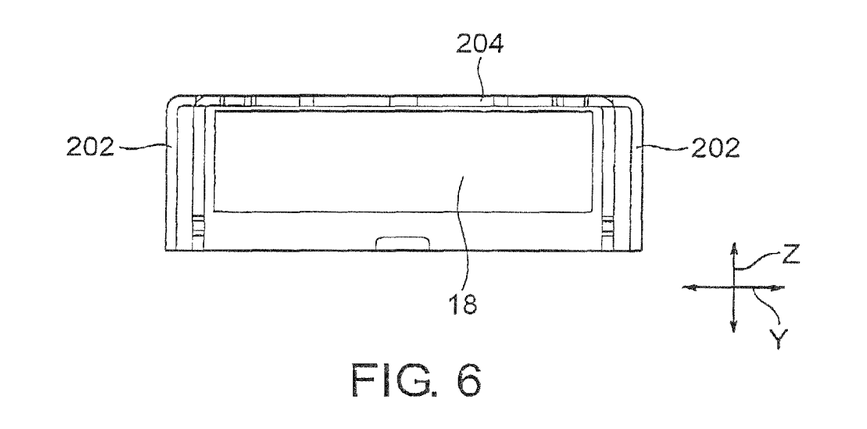
FIG. 6 is a perspective front view of the magnetic circuit illustrated in FIG. 5.

Referring to FIGS. 5 and 6, the description will proceed to the magnetic circuit for use in the lens driving device 10 illustrated in FIGS. 3 and 4. FIG. 5 is a perspective plan view of the magnetic circuit while FIG. 6 is a perspective front view of the magnetic circuit.

The magnetic circuit comprises the yoke 20 and the two flat-shaped permanent magnets 18. In the manner which is described above, the yoke 20 comprises the outer hollow cylindrical portion 202 having the substantially rectangular cylindrical shape, the substantially rectangular ring-shaped upper end portion 204 projecting from an upper end of the outer hollow cylindrical portion 202 inward, and the four inner vertical extending portions 206 which vertically extend from the four corners of the inside of the ring-shaped upper end portion 204 in parallel with the optical axis O downward. On the other hand, the two flat-shaped permanent magnets 18 are disposed to two opposed inner walls (two opposed inner walls in the fore-and-aft direction X) of the outer hollow cylindrical portion 202 of the yoke 20 so as to oppose to the driving coil 16 (FIG. 4) with a space left therebetween.

As shown in FIG. 6, each flat-shaped permanent magnet 18 has an area which occupies sixty percents or more of an area of one inner wall surface of the outer hollow cylindrical portion 202 of the yoke 20 to which the flat-shaped permanent magnet 18 in question is mounted. In addition, as shown in FIG. 5, each flat-shaped permanent magnet 18 has a length of a long side (a side extending in the left-and-right direction Y) which is ninety percents or more of a length of a long side (a side extending in the left-and-right direction Y) of one inner wall surface of the outer hollow cylindrical portion 202 of the yoke 20 to which the flat-shaped permanent magnet 18 in question is mounted.

Thus, it is possible to suppress a reduction of magnetic efficiency of the magnetic circuit although the number of the permanent magnets is reduced from four to two.

In addition, inasmuch as the two flat-shaped permanent magnets are used as the magnetic circuit, it is possible to reduce a component count. As a result, it is possible to reduce in costs and to reduce a mounting man-hour.

Figure 7:
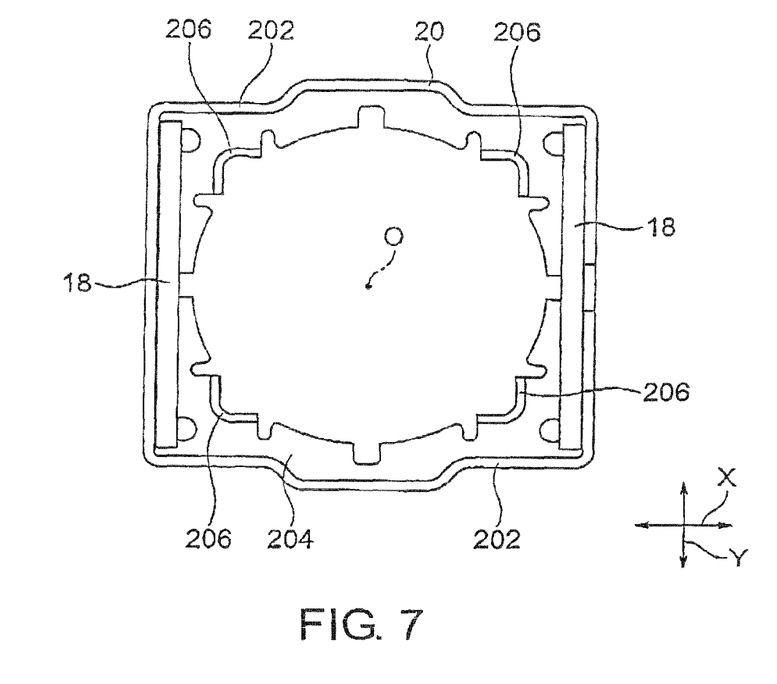
FIG. 7 is a bottom view of the magnetic circuit illustrated in FIG. 5.
Figure 8:
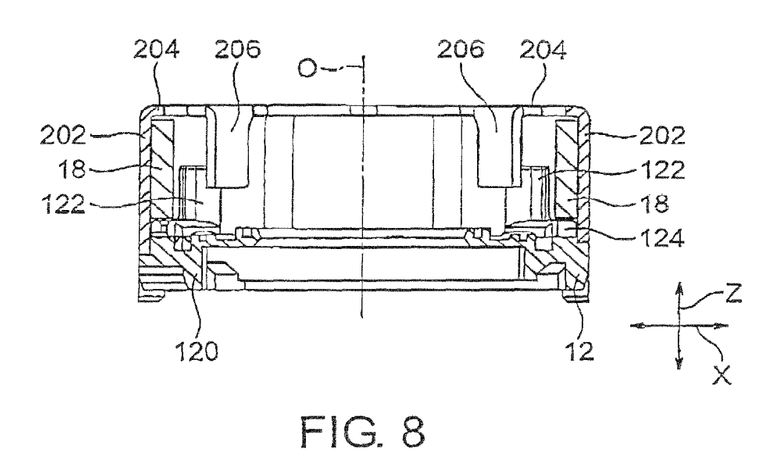
FIG. 8 is a vertical section of the lens driving device illustrated in FIG. 3.
Figure 9:
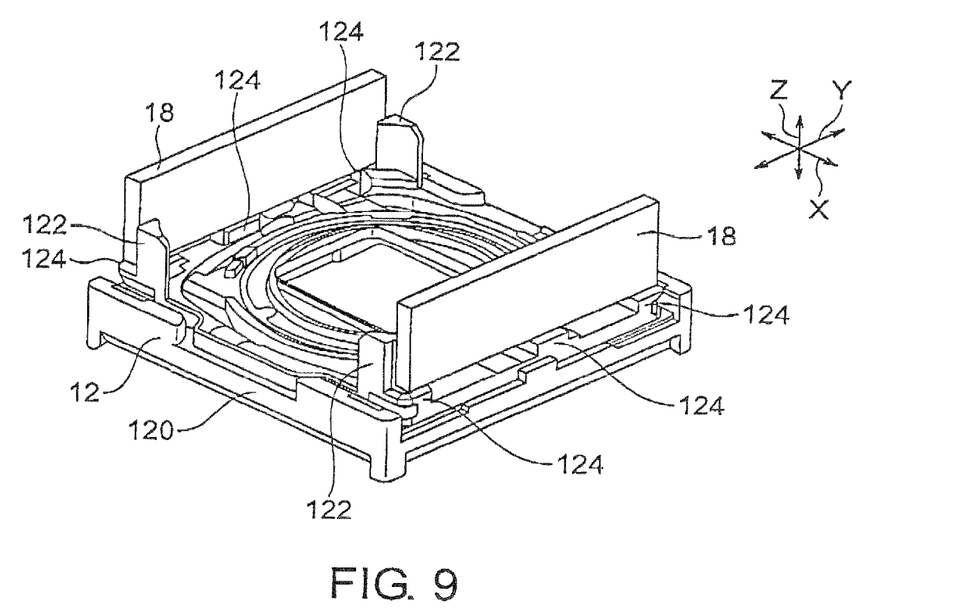
FIG. 9 is a perspective view showing a main portion of the fens driving device illustrated in FIG. 3.

Referring now to FIGS. 7 through 9, the description will proceed to a positioning structure of the permanent magnets 18 for use in the lens driving device 10 illustrated in FIGS. 3 and 4. FIG. 7 is a bottom view of the magnetic circuit. FIG. 8 is a vertical section of the lens driving device 10. FIG. 9 is a perspective view showing a main portion of the lens driving device.

As shown in FIG. 7, the both ends in a longitudinal direction (the both ends in the left-and-right direction X) of each flat-shaped permanent magnet 18 are guided (positioned) at the inner wall surfaces opposed in the left-and-right direction Y of the outer hollow cylindrical portion 202 of the yoke 20. In other words, the inner wall surfaces opposed in the left-and-right direction Y of the outer hollow cylindrical portion 202 of the yoke 20 serve as both-end guiding members (guiding surfaces) for guiding (positioning) the both ends in the longitudinal direction of each flat-shaped permanent magnet 18.

On the other hand, as shown in FIG. 8, a back surface of each flat-shaped permanent magnet 18 is guided (positioned) at the inner wall surface of the outer hollow cylindrical portion 202 of the yoke 20 to which the flat-shaped permanent magnet 18 in question is mounted while an upper end of each flat-shaped permanent magnet 18 is guided (positioned) at an inner wall surface of the ring-shaped upper end portion 204 of the yoke 20. In other words, the inner wall surfaces opposed in the fore-and-aft direction X of the outer hollow cylindrical portion 202 of the yoke 20 serve as back surface guiding members (guiding surfaces) for guiding (positioning) the back surfaces of the two flat-shaped permanent magnets 18. In addition, the inner wall surface of the ring-shaped upper end portion 204 of the yoke 20 serves as upper end guiding members (guiding surfaces) for guiding (positioning) the upper ends of the two flat-shaped permanent magnets 18.

Furthermore, as shown in FIG. 9, the actuator base 12 comprises a base portion 120 and four front guide projecting portions 122 which project in proximity to four corners of the base portion 120 upwards to guide (position) front surfaces of the two flat-shaped permanent magnets 18. That is, the four front guide projecting portions 122 serve as front surface guiding members for guiding (positioning) the front surfaces of the two frat-shaped permanent magnets 18. In addition, the actuator base 12 comprises six downward guide projecting portions 124 which project at both end portions in the fore-and-aft direction X of the base portion 120 upwards to guide (position) lower ends of the two flat-shaped permanent magnets 18. That is, the six downward guide projecting portions 124 serve as lower end guiding members for guiding (positioning) the lower ends of the two flat-shaped permanent magnets 18.

Accordingly, each flat-shaped permanent magnet 18 is easily guided (positioned) at all directions thereof mechanically.

In the above-mentioned lens driving device according to the exemplary aspect of this invention, the yoke may comprise, for example, an outer hollow cylindrical portion having a substantially rectangular cylindrical shape, a substantially rectangular ring-shaped upper end portion extending from an upper end of the outer hollow cylindrical portion inward, and four inner vertical extending portions which vertically extend from four corners of the inside of the ring-shaped upper end portion in parallel with the optical axis downward. In this event, the driving coil is mounted to an outer wall of the tubular portion of the lens holder so that the driving coil is accommodated in a space between the outer hollow cylindrical portion and the four inner vertical extending portions. In addition, the plurality of flat-shaped permanent magnets may be in number to two. In this event, the two flat-shaped permanent magnets are disposed to opposite two inner surfaces of the outer hollow cylindrical portion of the yoke so as to oppose to the driving coil with a space left therebetween. Each of the flat-shaped permanent magnets preferably has an area which occupies sixty percents or more of one inner wall surface of the outer hollow cylindrical portion of the yoke to which the flat-shaped permanent magnet in question is disposed. In addition, each of the flat-shaped permanent magnets desirably has a length in a long side that is ninety percents or more of a length of a long side of one inner wall surface of the outer hollow cylindrical portion of the yoke to which the flat-shaped permanent magnet in question is disposed.

An exemplary advantage according to the invention is that it is possible to suppress a reduction of magnetic efficiency of a magnetic circuit because each flat-shaped permanent magnets has both ends in a horizontal direction which extend in the proximity of opposed two sides of the yoke, and the driving coil is disposed so as to extend up to the vicinity of the both ends in the horizontal direction of each flat-shaped permanent magnet.

While this invention has been particularly shown and described with reference to the exemplary embodiment thereof, the invention is not limited to the embodiment. It will be understood by those of ordinary skill in the art that various changes in form and details may be therein without departing from the spirit and scope of the present invention as defined by the claims. For example, the permanent magnets are equal in number to two in the exemplary embodiment, the permanent magnets may certainly equal in number to four.

What is claimed is:

1. A lens driving device comprising:
   a lens holder including a tubular portion for holding a lens assembly;
   a ring-shaped driving coil fixed to said lens holder so as to position around the tubular portion;
   a rectangular hollow cylindrical yoke comprising a plurality of flat-shaped permanent magnets opposite to said driving coil; and
   upper and lower leaf springs disposed on both sides of the tubular portion of said lens holder in a direction of an optical axis, said upper and lower leaf springs supporting said lens holder in the direction of the optical axis shiftably so as to position said lens holder in a radial direction, whereby said lens holder is positionally adjustable in the direction of the optical axis, by energizing said driving coil, according to an interaction between a magnetic field of said permanent magnets and a magnetic field due to a current flowing through said driving coil;
   wherein each of said flat-shaped permanent magnets has two ends in a horizontal direction which extend in a proximity of opposed two sides of said yoke,
   wherein said driving coil is disposed so as to extend up to a vicinity of the two ends in the horizontal direction of each of said flat-shaped permanent magnets,
   wherein said yoke comprises:
      an outer hollow cylindrical portion having a substantially rectangular cylindrical shape;
      a ring-shaped upper end portion extending from an upper end of said outer hollow cylindrical portion inward; and
      four inner vertical extending portions which vertically extend from four corners of the inside of said ring-shaped upper end portion in parallel with the optical axis downward,
   wherein said driving coil is mounted to an outer wall of the tubular portion of said lens holder so that said driving coil is accommodated in a space between said outer hollow cylindrical portion and said four inner vertical extending portions, and
   wherein two of said flat-shaped permanent magnets are provided, said two flat-shaped permanent magnets being disposed opposite two inner surfaces of the outer hollow cylindrical portion of said yoke so as to oppose to said driving coil with a space left therebetween.

2. The lens driving device as claimed in claim 1, wherein each of said flat-shaped permanent magnets has an area which occupies sixty percent or more of one inner wall surface of the outer hollow cylindrical portion of said yoke to which said flat-shaped permanent magnet in question is disposed.

3. The lens driving device as claimed in claim 1, wherein each of said flat-shaped permanent magnets has a length in a long side that is ninety percent or more of a length of a long side of one inner wall surface of the outer hollow cylindrical portion of said yoke to which said flat-shaped permanent magnet is disposed.

* * * * *